(12) United States Patent
Peek et al.

(10) Patent No.: US 6,292,799 B1
(45) Date of Patent: Sep. 18, 2001

(54) METHOD AND APPARATUS TO AUTOMATICALLY ADDRESS A VOICE MAIL REPLY TO A VOICE MAIL MESSAGE

(75) Inventors: David P. Peek, Atkinson, NH (US); Paul F. Finnigan, Los Gatos, CA (US); Rosanna Garcia, Lynn, MA (US)

(73) Assignee: NetNumber.com, Inc., Lowell, MA (US)

( * ) Notice: Subject to any disclaimer, the term of this patent is extended or adjusted under 35 U.S.C. 154(b) by 0 days.

(21) Appl. No.: 09/092,764

(22) Filed: Jun. 5, 1998

(51) Int. Cl.[7] .................................................. G06F 17/30
(52) U.S. Cl. ........................ 707/10; 707/10; 707/102; 379/88.18; 379/88.02; 379/88.19
(58) Field of Search ................................. 379/45, 67, 88, 379/89, 93.01, 57, 84, 88.26, 80, 355, 88.02, 52, 88.17, 88.18, 207, 215; 707/10, 102

(56) References Cited

U.S. PATENT DOCUMENTS

| | | |
|---|---|---|
| 4,924,496 | 5/1990 | Figa et al. .............................. 379/142 |
| 4,942,598 * | 7/1990 | Davis ...................................... 379/57 |
| 5,046,088 | 9/1991 | Margulies ............................. 379/211 |
| 5,572,576 * | 11/1996 | Klausner et al. ........................ 379/67 |
| 5,583,919 * | 12/1996 | Talvard et al. .......................... 379/67 |
| 5,594,784 * | 1/1997 | Velius ..................................... 379/88 |
| 5,608,784 * | 3/1997 | Miller ..................................... 379/88 |
| 5,646,839 * | 7/1997 | Katz ................................... 379/93.01 |
| 5,661,784 * | 8/1997 | Zinke ..................................... 379/89 |
| 5,684,862 | 11/1997 | Finnigan ................................. 379/88 |
| 5,687,220 | 11/1997 | Finnigan ................................. 379/67 |
| 5,692,038 | 11/1997 | Kraus et al. .......................... 379/210 |
| 5,799,061 * | 8/1998 | Melcher et al. ........................ 379/45 |
| 5,809,128 * | 9/1998 | McMullin et al. ................... 379/215 |
| 5,825,854 * | 10/1998 | Larson et al. ........................... 379/67 |
| 5,940,476 * | 8/1999 | Morganstein et al. ............. 379/88.02 |
| 5,943,395 * | 8/1999 | Hansen ................................... 379/52 |
| 5,963,618 * | 10/1999 | Porter ................................. 379/88.17 |
| 6,005,922 * | 12/2000 | Longster et al. .................... 379/88.18 |
| 6,011,834 * | 1/2000 | Jeong ................................. 379/88.26 |
| 6,038,305 * | 3/2000 | McAllister et al. .................. 379/207 |
| 6,061,432 * | 5/2000 | Wallace et al. .................... 379/88.18 |
| 6,094,475 * | 7/2000 | Kang ....................................... 379/84 |
| 6,122,357 * | 9/2000 | Farris et al. .......................... 379/207 |

FOREIGN PATENT DOCUMENTS

| | | | |
|---|---|---|---|
| 2134052 * | 5/1990 | (JP) ...................................... 379/355 |
| 3174858 * | 7/1991 | (JP) ........................................ 379/80 |

OTHER PUBLICATIONS

Electronic Messaging Association, "Welcome to the Electronic Messaging Assoication", What's New? (Home Page) wysiwyg://70/http://www.ema.org/ printed Oct. 8, 1998.

VPIM White Paper, "Unified Messaging: The VPIM Initiative"; Bernard M. Elliot, consultant, Vanguard Communications Corporation; http://www.ema.org/vpimdir/present/vpimwp.html; Adapted for republication with permission of publisher, Business Communications Review, from vol. 27, No. 5 (May 1997), pp 43–47; printed Oct, 8, 1998.

VPIM Frequently Asked Questions, "The Voice Profile for Internet Mail (VPIM) Work Group", last updated Oct. 7, 1998; http://www.ema.org/vpimdir/present/faq.html; printed Oct. 8, 1998.

"The Voice Profile for Internet Mail (VPIM) Work Group"; last updated Oct. 7, 1998, http://www.ema.org/vpimdir/present/mission.htm; printed Oct. 8, 1998.

* cited by examiner

Primary Examiner—Wayne Amsbury
Assistant Examiner—Thuy Pardo
(74) Attorney, Agent, or Firm—Wolf, Greenfield & Sacks, P.C.

(57) ABSTRACT

A voice mail system in which a recipient of a call is provided with the ability to reply to an internal or external voice message in a common manner. A method for providing a reply includes identifying a caller, and retrieving an address of the caller from a database. Caller origination information is automatically provided with a recorded message from the caller to enable a recipient of the recorded message to reply. Identifying the caller may include searching a database using a voice signature of the caller to identify caller information.

33 Claims, 10 Drawing Sheets

CALLER RECORD INFO:
- (Record Identification)
- Name (string)
- Company Name (string)
- Address, etc (string)
- Direct Number (tel #)
- Mobile Phone (tel #)
- Home Phone (tel #)
- Additional ANI Phone Source (tel #)
- Additional ANI Phone Source (tel #)
- Additional ANI Phone Source (tel #)
- Fax Phone (tel #)
- Pager Number (tel #)
- Spoken Name (WAV) (file)
- Voice Mailbox DID Number (tel #)
- Voice Mailbox Number, Extension (tel #, extn)
- VPIM Address (SMTP, X400)
- Email address (SMTP, X400)
- (VCARD) (structure)

CURRENT CONTACT DIRECTORY:
- array of current contact (USER RECORD INFO)

FORWARD CALLS:
- All Calls Forwarded Number (tel #)
- Forward Calls based on a Caller's identity (ANI, tel #) or (ID, tel #)

SCRIPT OPTIONS:
- Ask for user's name (Y or N)
- Allow Caller Registration (Y or N)
- Allow Caller Research (Y or N)
- Follow Me (Enabled or Disabled)
- Auto Update Contact Directory with frequent callers (Y or N)
- ASR enable or disable

Fig. 10

METHOD AND APPARATUS TO AUTOMATICALLY ADDRESS A VOICE MAIL REPLY TO A VOICE MAIL MESSAGE

FIELD OF THE INVENTION

The present invention relates to voice messaging, and in particular to a method and apparatus for responding to both internal (those from within the same voice messaging system) and external voice messages (those from outside the voice messaging system).

BACKGROUND OF THE INVENTION

A voice mail system (VMS) provides a voice mailbox that allows an inbound voice message to be stored when the user is away from the receiving telephone or in the event a busy signal is encountered by a caller, so that the recipient can learn of the call. The caller may also choose to leave a message directly in the voice mailbox of the recipient of the call when a "live call" is not necessary or desired.

One additional feature of a VMS allows a recipient of an internal call (from another person having an account on the same VMS) to listen to a message stored in his or her voice mailbox and, by operating the keys on a telephone keypad, to initiate a reply to the message. To initiate a reply to the internal message, the recipient does not need to identify the extension of the source of the call because the VMS supplies the source extension. However, an internal call is generally identified by the extension from which the call was placed (source/extension), not the caller. Thus, if the caller did not use his or her own phone, a reply would be sent to the calling extension, not to caller's personal extension.

A receiver can reply with a "live call" to the calling extension by pressing keys on the number pad and being directly connected. Alternatively, a message direct to the voice mail box of the calling extension can be created by pressing the appropriate keys to initiate the reply command; the recipient records the reply message and hangs up; the VMS automatically sends the recorded reply message to the voice mailbox of the calling extension. Again, this reply feature is only available for calls between users having accounts on the same VMS (internal callers), and only when the voice message includes a return voice mailbox address of the original calling location. Recipients of calls from external callers (people external to the VMS), such as cellular phone users, etc., cannot automatically send a reply to such messages since the reply feature cannot identify the source of the call. Rather, the recipient must listen to the message, write down the name and number of the caller and then after hanging up, call back the person who left the message.

Voice messaging also allows internal communication from one caller to multiple recipients on the same VMS system without the caller initiating a call to each individual recipient's voice mailbox.

Two or more VMSs of a similar type may be connected together to operate as a single VMS. The two VMSs can be at different locations. The network may operate through, for example, a dial up (e.g., analog line) connection, or a digital connection (e.g., an Integrated Services Digital Network (ISDN) lines).

Sending messages and replies in a voice message network requires a protocol for communicating between the separate VMS systems. A widely-used protocol for distributing voice messages using analog lines between networked VMS systems is the Audio Messaging Interchange Specification (AMIS), available for analog telephone lines (AMIS-A) or for a digital network (AMIS-D). The AMIS-A protocol distributes messages via a voice dial-up line; Dual Tone Multi Frequency (DTMF) tones are used for signaling.

Individual VMS companies have also developed their own proprietary protocols to use between their own VMS systems. However, due to the proprietary nature, these protocols only work between VMS systems made by the same company; VMS equipment from different companies, each with its own proprietary protocol, are unable to communicate with one another.

Currently, voice message networking does not allow a receiver of a message to automatically reply to caller on a different VMS. Therefore, a person on a VMS can receive an internal message (i.e., from a caller on a same VMS or VMS network) and an external message (i.e., from a different VMS, mobile phone, home phone, etc.), but cannot reply in the same manner to each type of message.

What is needed is a system that allows a recipient to reply to any internal or external voice message in a common manner. Additionally, a system is needed to return a call to an actual caller, not just the location (calling extension) from which the message or call is sent.

SUMMARY OF THE INVENTION

In one embodiment of the present invention, a recipient of a call is provided with the ability to reply to an internal or external voice message in a common manner.

In another embodiment, a caller generated identifier is used to search a database for caller information.

In another embodiment, a method is provided for forming a reply to a voice message on a first voice mail system, including the steps of identifying a caller, retrieving information related to the identified caller, and providing the retrieved information to a second voice mail system information to enable a call recipient to reply to the voice message.

In another embodiment, a method of retrieving information about a caller is provided and includes the steps of identifying a calling location of the caller, recording a vocal utterance made by the caller and accessing a database as a function of the identified calling location and the recorded vocal utterance.

In another embodiment, a method of replying to a caller includes the steps of identifying a calling location of the caller, storing a vocal utterance made by the caller, accessing a database as a function of the identified calling location and the recorded vocal utterance to retrieve caller information, wherein the caller information includes a caller reply location and sending a reply to the caller reply location.

In another embodiment, a method of storing a single voice mail message from a caller includes the steps of identifying a calling location of the caller, recording a spoken name uttered by the caller, accessing a database as a function of the identified location and the recorded spoken name to retrieve the caller information and recording a message uttered by the caller and storing the recorded spoken name and the recorded message information together as a single voice mail message.

In another embodiment, a system for retrieving information about a caller includes means for identifying a calling location of the caller, means for storing a vocal utterance made by the caller and means for accessing a database as a function of the identified calling location and the recorded vocal utterance.

In another embodiment, a system for replying to a caller includes means for identifying a calling location of the caller, means for recording a vocal utterance made by the caller, means for accessing a database as a function of the identified calling location and the recorded vocal utterance to retrieve caller information, wherein the caller information includes a caller reply location and means for sending a reply to the caller reply location.

In one embodiment, the calling location is different from the caller reply location.

In another embodiment, the reply is an electronic mail message or a recorded message.

In another embodiment, the caller reply location is a voice mailbox.

In another embodiment, the vocal utterance is converted to a string of characters, wherein the database is accessed as a function of the string of characters.

In another embodiment the voice utterance is identified using speaker verification or speech recognition to access the database.

BRIEF DESCRIPTION OF THE DRAWINGS

FIG. 10 is a representation of caller information stored in a voice directory database.

DETAILED DESCRIPTION

In accordance with one embodiment of the present invention, a method and apparatus for identifying a caller is provided to allow a common method of replying to internal (from a same voice mail system) and external (from a different voice mail system or external to the voice mail system) calls. A call handling reply system intercepts incoming messages and provides caller information, including a return address, to a Voice Mail System (VMS). The caller may be identified (at least in part) by his/her spoken name which is used to search a database of caller information.

Figure 1:
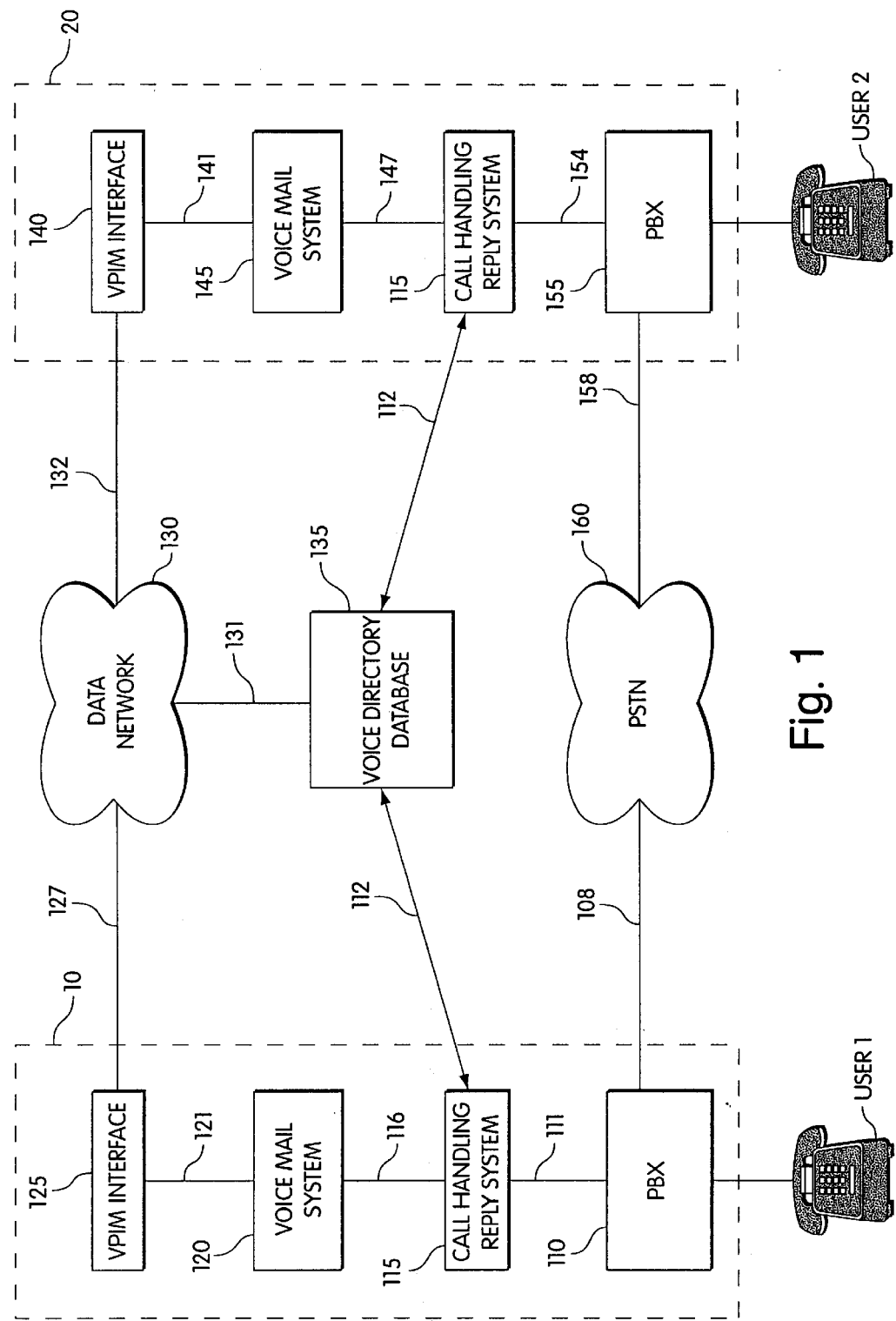
FIG. 1 is a block diagram of a voice messaging system according to one embodiment of the present invention.

As shown in FIG. 1, a system 10 for handling phone calls of user 1 includes a Private Branch Exchange (PBX) 110, a call handling reply system 115, a voice mail system (VMS) 120 and a VPIM interface 125. Similarly, a second system 20 for user 2 includes a PBX 155, a call handling reply system 115, a voice mail system 145 and a Voice Profile for Interface Mail Extension (VPIM) interface 140. The PBXs 110, 155 may be connected by either analog or digital lines 111, 154 to the call handling reply systems 115. In one embodiment, PBX systems 110, 155 may be replaced by other electronic switching or computer devices connected directly to a Local Area Network (LAN) to distribute calls. Each user of the PBX may use a single call handling reply system. The call handling reply system 115 may be connected to the voice mail systems 120, 145 over a T1, T1 and RS-232, or an analog and RS-232 serial connection 116, 147. In addition, call handling reply system 115 may operate with only one VMS and one PBX system. The voice mail systems 120, 145 may be connected to the VPIM interfaces 125, 140 through connections 121, 141. The VPIM interface may also be embedded in its respective VMS which would allow the VMS to be connected directly to voice directory database 135. The VPIM interfaces 125, 140 are connected to a data network 130, e.g., an internet, and communicate using the VPIM protocol. In one embodiment, a proprietary protocol may be used.

A voice directory database 135 is provided and is connected to the data network 130 through connection 131. Additionally, the voice directory database 135 is connected to the call handling reply systems 115 through connections 112, and communicate using a standard or proprietary database protocol. PBXs 110, 155 are connected to a Public Switch Telephone Network (PSTN) 160 via connections 108, 158, respectively.

Figure 2:
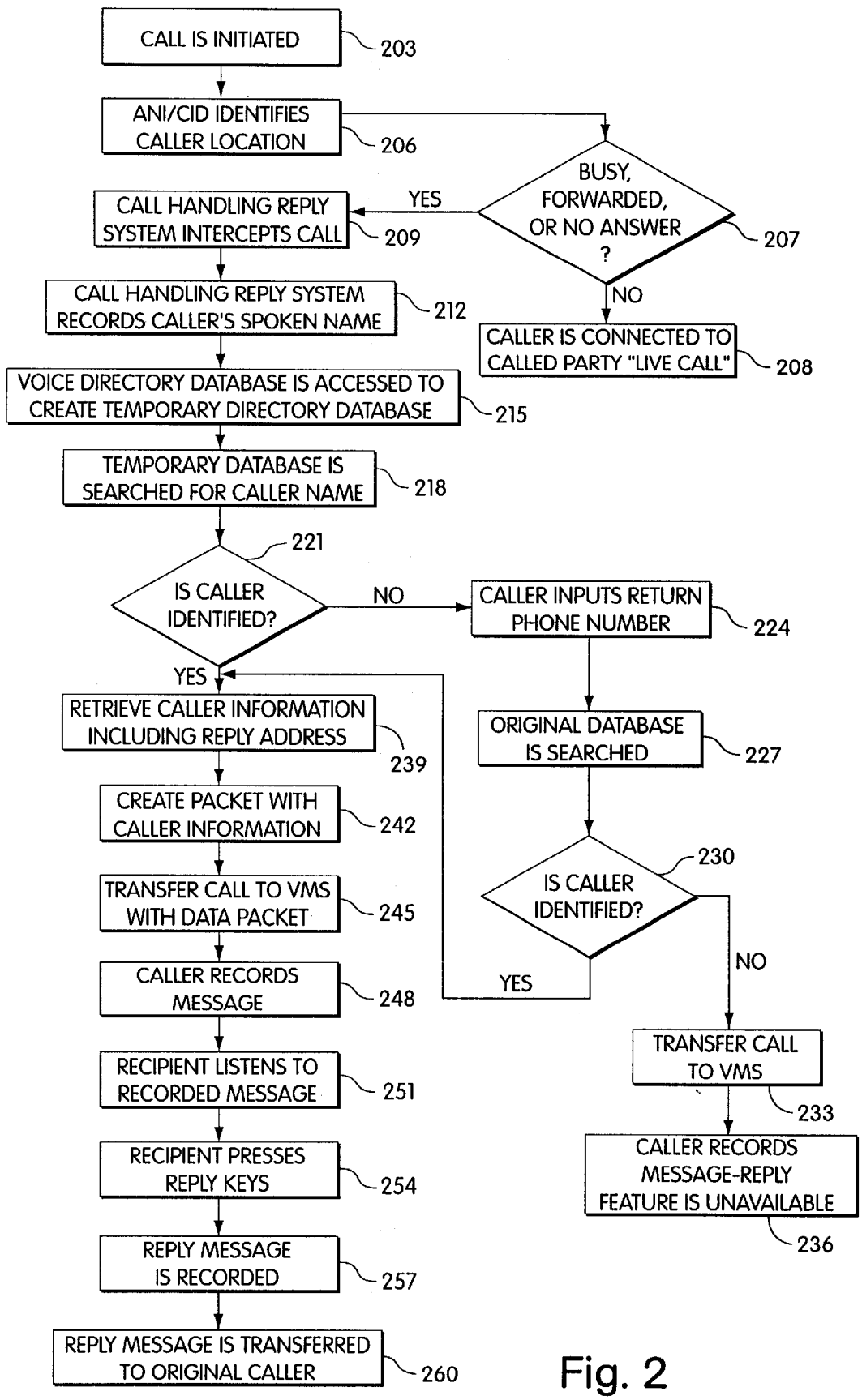
FIG. 2 is a flowchart illustration of a process for replying to a voice message.

The operation of the components in FIG. 1 will now be described in connection with the flowchart of FIG. 2. PSTN 160 is commonly accessed by telephones, fax machines and PBX systems. In this example, user 1 places a call to user 2; user 1 and user 2 being connected through PBX 110, PSTN 160 and PBX 155. The call handling reply systems 115 provide a hardware and software interface between the PBXs 110, 155 and VMSs 120, 145 as described in greater detail below.

The call handling reply systems 115 handle calls on PBXs 110, 155; they identify the caller and the reason the call was sent to the call handling reply systems (e.g., busy, no answer, forwarded, etc.) and they enable VMSs 120 or 145 to reply to the call in a common manner, regardless of whether the call is internal (i.e., from the same VMS system) or external (i.e., from outside the VMS, e.g., mobile phone, home phone, etc.).

In one embodiment, a standard protocol, Voice Profile for Internet Mail (VPIM) developed by the Electronic Messaging Association (EMA) (a group made up of independent voice mail manufacturers), allows compliant VMSs to transfer messages to each other. VMSs which are VPIM compliant are able to communicate with each other, even if each VMS is made by a different manufacturer with its own proprietary protocol, since the VPIM protocol is common between them. VPIM is built on top of the Enhanced Simple Mail Transport Protocol/Multiple Purpose Internet Mail Extension (ESMTP/MIME) that allows each VMS to send and receive messages, such as voice messages, to one another over the Internet using the ESMTP/MIME standard to define a structure of the message. VPIM allows VMSs with different priorities, delivery standards and features to communicate according to a caller's messaging expectations as defined by the caller's VMS. Without VPIM, messages can only be transferred between same type VMSs made by the same manufacturer, using a common proprietary protocol. VPIM interface 125 connects VMS 120 through data network 130 (e.g., the Internet) to VPIM interface 140.

In another embodiment, a service provider, such as Unifi Communications, Inc., Lowell, Mass., may be used to transfer voice messages between VMSs when VPIM compliant messages are not available or are not used by all parties to a call. The service provider may maintain a voice directory database of callers so that a VMS may access a voice mail address of a caller. Service providers may provide global customer information to local users to allow messaging and replying to messages in a global environment. In addition, service providers may communicate with other service providers to update customer information in voice directory databases and to ensure that the service providers can communicate with each other when necessary. Other methods of automatically or manually updating the voice directory database may be used.

Voice directory database 135 is accessible by call handling reply systems 115 through data network (e.g., Internet) protocol connections 127 and 132, or directly through database protocol connections 112. Voice directory database 135 provides caller information, including a reply address, to the call handling reply system 115 that has queried voice directory database 135 in order to identify the caller.

For example, when a call is initiated (step 203 in FIG. 2) and PBX 155 receives a first ring of the telephone call, an automatic number identification (ANI), caller identification (CID), or other known method of identification of the telephone call, is associated with the caller location (step 206). The ANI/CID is used to identify the calling extension and does not necessarily identify the actual caller. For example, if an employee of a business placed a call, the ANI/CID for the call would only give information related to the company's main number, although it might possibly identify an extension from which the call was placed. The ANI/CID, however, does not necessarily identify the actual caller placing the call.

In step 207, a determination is made as to whether or not the called party, user 2, is able to answer the call, i.e., busy, no answer, or calls forwarded. If user 2 is available, the process proceeds to step 208 where the caller is connected and a "live call" will ensue.

When a busy/no answer/call forwarded signal is encountered, call handling reply system 115 intercepts the call in step 209, and receives information about the call from PBX 110, including ANI/CID information and the reason for the call (e.g., busy, forwarded, no answer, etc.). Call handling reply system 115 requests the caller (i.e., user 1) to speak his or her name. In step 212, call handling reply system 115 records the spoken name. In an alternate embodiment, any tones which uniquely identify a caller in a secure manner may be recorded by the call handling system in step 212.

An example of a caller record in voice directory database 135 is shown in FIG. 10. The caller record may include information such as the caller name, company name, caller address, a recording of the caller's spoken name in a voice file, direct telephone number and voice mailbox number. The entries in the voice directory database may be updated by a standard service provider or may be dynamically updated by users of the database. The database is not limited to any particular format or look up protocol. One example of a hierarchial directory that may be used is an X500 directory by Control Data Systems; the X500 directory may be accessed, for example, using Lightweight Directory Access Protocol (LDAP) developed by Netscape.

As shown in FIG. 10, a caller record in voice directory database 135 may also include information pertaining to how to handle calls to a voice mailbox. For example, conditions to forward some calls or all calls based on a caller's identity may be included in the caller record. An option which is listed as caller research may be chosen to allow an operator to attempt to register an unidentified caller through a series of questions by the operator.

Voice directory database 135 may include information regarding usual caller expectations for message handling; these may be initially defined at the time a caller is entered into the voice directory database. For example, different VMSs may include different features or the features may be defined differently. By defining user preferences in the database, the desired information is automatically obtained when the caller information is retrieved by a call handling reply system. One example of a preference may be a caller that requests a message to be delivered to a different mailbox location, for example, a person traveling for an extended period of time, or to support an all-in-one mailbox. Voice directory database 135 may also perform feature normalization which can resolve problems when a feature has a different meaning on different systems. For example, in one system, a priority definition may instruct a VMS to deliver the message immediately, while another VMS may define a priority as a message that must be delivered within sixty minutes. As discussed above, VPIM allows these caller expectations to be communicated so as to allow a call to be handled according to the caller's expectations.

Voice directory database 135 may also include dialing plans of callers accessing the database. The dialing plans identify the callers in a manner to prevent mishandled calls due to same phone numbers or extensions assigned to different callers at different locations. The database may be arranged to uniquely identify each VMS caller and may store entries by relating potential callers with potential recipients. A caller may be identified by a node number, a physical address number and/or a dial plan number. When entries are made to initialize files in a voice directory database, any numbers that are the same in any two nodes are resolved to allow unique identification of each caller. To uniquely identify individual mailboxes, a service provider may assign each address a prefix to be appended to a destination address. If a company does not add a prefix, the service provider may maintain default prefixes for a given company.

In one embodiment, the caller's identity cannot be identified merely by the ANI/CID found in step 206. The combination of the identified ANI/CID along with the voice signature recorded in step 212, can be used however to search the voice directory database 135. In order to perform a more accurate and timely search of the voice directory database 135, all entries having the ANI/CID identification are retrieved from the voice directory database 135 to create a smaller temporary directory database, (step 215). In one embodiment, the phone number being called may be used to create a smaller temporary directory database in step 215. In an alternate embodiment, an ANI/CID number may not be available. In addition, any caller identifier, such as any tones which uniquely identify a caller in a secure manner which are recorded by the call handling system 115 (in step 212), may used to search the database.

In one embodiment, the temporary database includes only a list of text names taken from the voice directory database 135. This temporary database would include a list of hose names from the voice directory database 135 which matched the ANI/CID and another list based on the phone number being called. In another embodiment, the temporary database may include the list of names identified by the ANI/CID, as well as the associated caller records.

In step 218, the call handling reply system searches text names in the temporary database (created in step 215) using the recorded spoken name of the caller; the spoken name was recorded by the call handling reply system in step 212. The process of identifying a caller's text name in a database from a recorded spoken name may be performed by a variety of technologies such as speech recognition and/or speaker verification. In other words, the spoken name is connected to text.

In one embodiment of searching a temporary database, the spoken name may be processed by a speech recognition system such as ReCite by Pure Speech, or by similar speech recognition systems by Lemout and Hauspie, Dragon Systems or IBM. The speech recognition system recognizes what name is spoken, but does not distinguish who has spoken the name. Such a system operates by matching phonemes, which are the smallest increments of speech that distinguish one utterance from another in a language or dialect.

A speaker verification system may also be used to identify not only what is spoken, but also who has spoken it and may be used to identify a situation when a caller speaking a name is not that person. Speaker verification could be used in applying a higher level of security to the system.

Next, it is determined if the caller can be identified from the names in the temporary database in step 221. If the caller's name is found in the list of names in the temporary database (step 221), then the entry in the voice directory database 135 related to the caller name is retrieved (step 239). The retrieved caller information may include a previous recording of the spoken name, the caller's name, telephone number, reply mailbox address and other caller information. In one embodiment, i.e., when the temporary database includes the associated caller records and the list of names retrieved from the voice directory database 135 as identified by the ANI/CID and/or by a number being called, the voice directory database does not need to be accessed in this step.

The information retrieved in step 239 is used to create a Simplified Message Desk Interface (SMDI) data packet. This data packet includes information such as the reply address of the caller (e.g., user 1) and will be used to allow the recipient (e.g., user 2) of the voice mail message to reply to the voice mail message left by the external caller (e.g., user 1). The data packet may also include a date/time stamp and special handling instructions (e.g., urgent, private, etc.).

Figure 3:
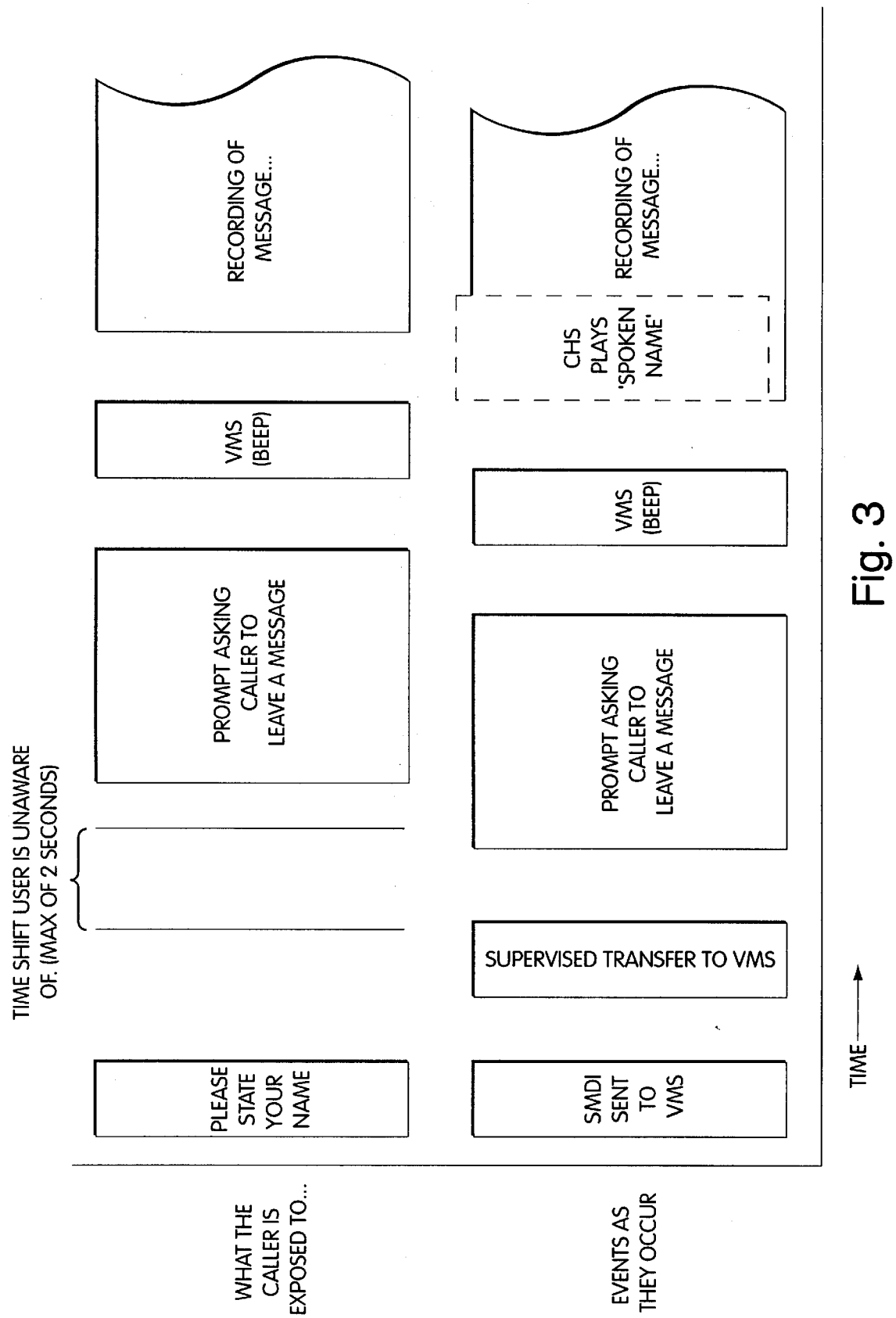
FIG. 3 is an example process for adding a voice signature to a voice message.

The call is then transferred, step 245, to user 2's VMS 145 with the data packet. VMS 145 receives the call and prompts the caller to record a message. The caller records the message in step 248. As shown in FIG. 3, the recorded spoken name will be appended to any voice mail message the caller creates so as to act as a voice signature for the caller. After a caller is prompted for his or her spoken name, the caller is invited to leave a message. The recorded name becomes part of the voice mail message and may be transported with the message sent from the voice mail system. Recording a voice signature as part of the voice mail message allows an unidentified caller (e.g., user 1) to be identified by their voice signature when the called party (e.g., user 2) retrieves the message from the VMS. The voice signature may be stored in the voice directory database 135 for future use. For example, the voice signature may be used by the recipient when composing a reply message to verify the reply message is being sent to the correct caller.

The recipient of the message may listen to the recorded message in step 251 and then may press reply keys to reply to the recorded message in step 254. The keys pressed by the recipient may be any keys that allow a reply to a message, either a live return call or a message for user 1's voice mail box, such that the recipient no longer needs to distinguish between a message from an internal or an external caller. After the sequence of reply keys are pressed, the recipient is either connected or may record a reply message in step 257. It should be noted that depending on the capabilities of the components in the call handling reply system, the VMS and the voice directory database, (and potentially depending on other factors as well), several of the above steps may be performed in parallel; e.g., the call handling reply system may be identifying a caller as the caller is recording a message.

Based on the identifying information in the data packet transferred to VMS 145, the reply message is sent to the original caller in step 260. In one embodiment, using the voice signature of the caller (which is the spoken name of the caller recorded in the voice directory database 135 in step 212), the recipient creating the reply message may verify the return caller information. For example, after retrieving a message from the caller, the call handling reply system may prompt the recipient to verify the caller. The recipient may press a key to hear the voice signature recorded by the caller associated with the recorded message. The recipient may then determine if the voice signature is the caller to whom the recipient wants to reply. If it is, then the recipient may compose a reply message. If not, the recipient may still choose to reply or may choose to independently make a live call or to create a new message.

The reply message may be sent to a service provider, such as the operator of voice directory database 135 for forwarding to the original caller, as discussed above in connection with the voice directory database 135. In one embodiment, the reply message is sent using a VPIM interface to a data network, such as the Internet, and then sent to the VMS of the original caller, or over analog phone lines to the caller.

Returning now to step 221, when the caller cannot be identified from the entries in the temporary database based on a search for the caller name, the caller is prompted to input a return phone number in step 224. The return phone number is entered by pressing the keys on the phone to generate DTMF signals.

Using the phone number entered by the caller, the voice directory database 135 is searched in step 227 to determine if the caller can be identified. If an entry matching the return phone number is found in the database in step 230, then the caller is identified and the process continues at step 239 in which the caller information, including the reply address, is retrieved as discussed above.

However, if an entry in the database matching the return phone number is not found and, therefore, the caller is not identified in step 230, then the call is passed to the VMS 145 in step 233. In one embodiment, since the caller was not identified, the return address of the caller is not passed to VMS 145. Therefore, in step 235, the caller records the message on VMS 145 and the reply feature is unavailable to the recipient of the message. The recipient may still reply to the message if desired by alternate methods, e.g., listening to the message where user 1 has left a number where he can be reached.

In one embodiment when the caller is not identified, an outbound delivery message system may be used. An address of a service provider (e.g., the operator of a voice directory database) is provided to VMS 145 with the voice mail message from the caller who cannot be identified in the database 135. If a recipient of the voice mail message chooses to reply to the message, then the reply message is sent to the address of the service provider. The service provider may then use a computer system to automatically call a phone number associated with the original caller in order to provide the reply message to the caller. The reply message is provided as a live call to the original caller based on a telephone number entered by the original caller or after research is performed by a service provider, can be delivered to the original caller's voice mail box..

In another embodiment when the caller is not identified, an operator may intercept the call when the caller cannot be identified by a search of the voice directory database 135. The operator may request information to allow the caller to be entered into the voice directory database 135 along with any associated information about the caller to allow the reply feature to work when the recipient attempts to reply to the call. The information may include, for example, the name of the caller, voice mail address, return phone number, and VPIM address (e.g., a standard E-mail address, usually a phone number at a domain address). The voice directory database 135 is then manually or automatically updated with the caller information and a data packet is sent with the voice message to VMS 145.

The voice messaging system shown in FIG. 1 may be incorporated in many forms in a remote office and/or in a headquarters office. FIGS. 4–9 illustrate various voice messaging systems in greater detail, as well as more detailed connections of a call handling reply system between a PBX and a VMS system.

Figure 4:
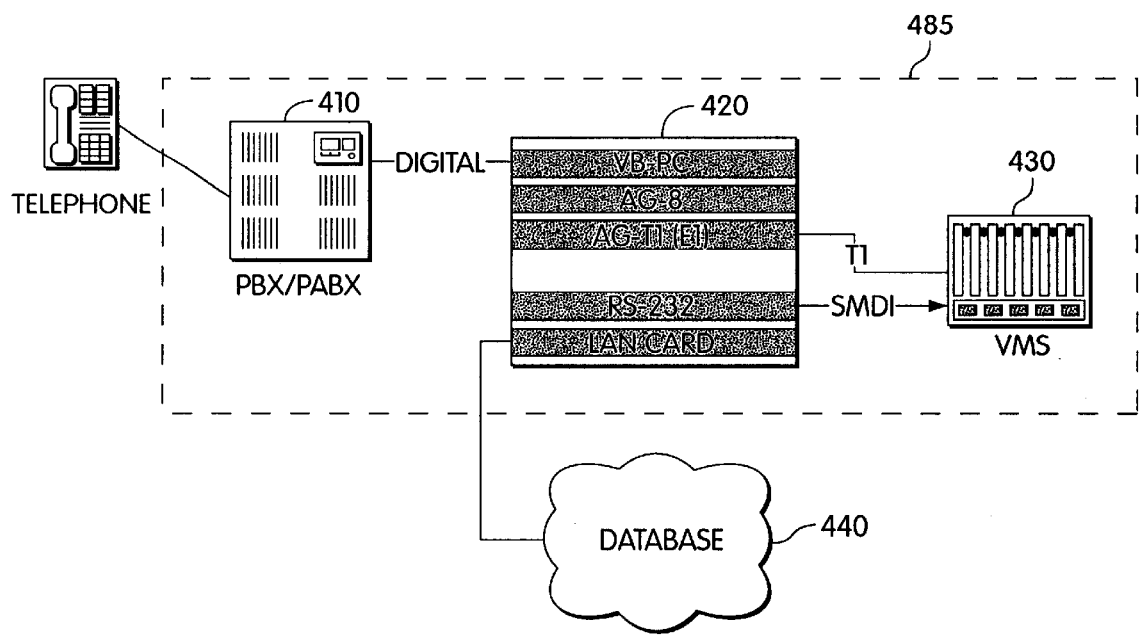
FIG. 4 is a block diagram of a call handling reply system in a telephone environment at a customer location.

In one alternative embodiment shown in FIG. 4, a call handling reply system may be included within a telephony environment 485 (e.g., a customer premise environment). A call handling reply system 420 is shown connected between PBX 410 and VMS 430. Call handling reply system 420 is invisible to both PBX 410 and VMS 430 and receives all busy/no answer calls. Call handling reply system 420 determines an identity of a caller by querying voice directory database 440, packets the information about the caller and passes the call with the packeted caller information to VMS 430 to allow a call handling reply.

In one embodiment, the SMDI link provides a data packet including a reply address of the caller to VMS 430. In this embodiment, call handling reply system 420 is connected to voice directory database 440 (which stores caller information) through a Local Area Network (LAN) card. Call handling reply system 420 may also include a Voice Bridge Personal Computer (VB-PC) board, such as a VB-1001 by Voice Technologies Group, and may include eight ports per board and one Multi-Vendor Integration Protocol (MVIP) interface. The VB-PC board emulates digital phones to allow an interface from a computer to PBX 410. Call handling reply system 420 may also include an interface to VMS 430 using a T1 card, for example, an AG-T1 interface card in the PC and at least one RS-232 serial port. AG-T1 interface board may include one T1 termination, one MVIP interface with enhanced compliant MVIP switching, with twenty-four ports digital signal processing (DSP) voice and call processing per board, at seven MIPS per port. An AG-8 card included in call handling reply system 420 may include eight ports per board with DSP processing power of ten MIPS per port.

Figure 5:
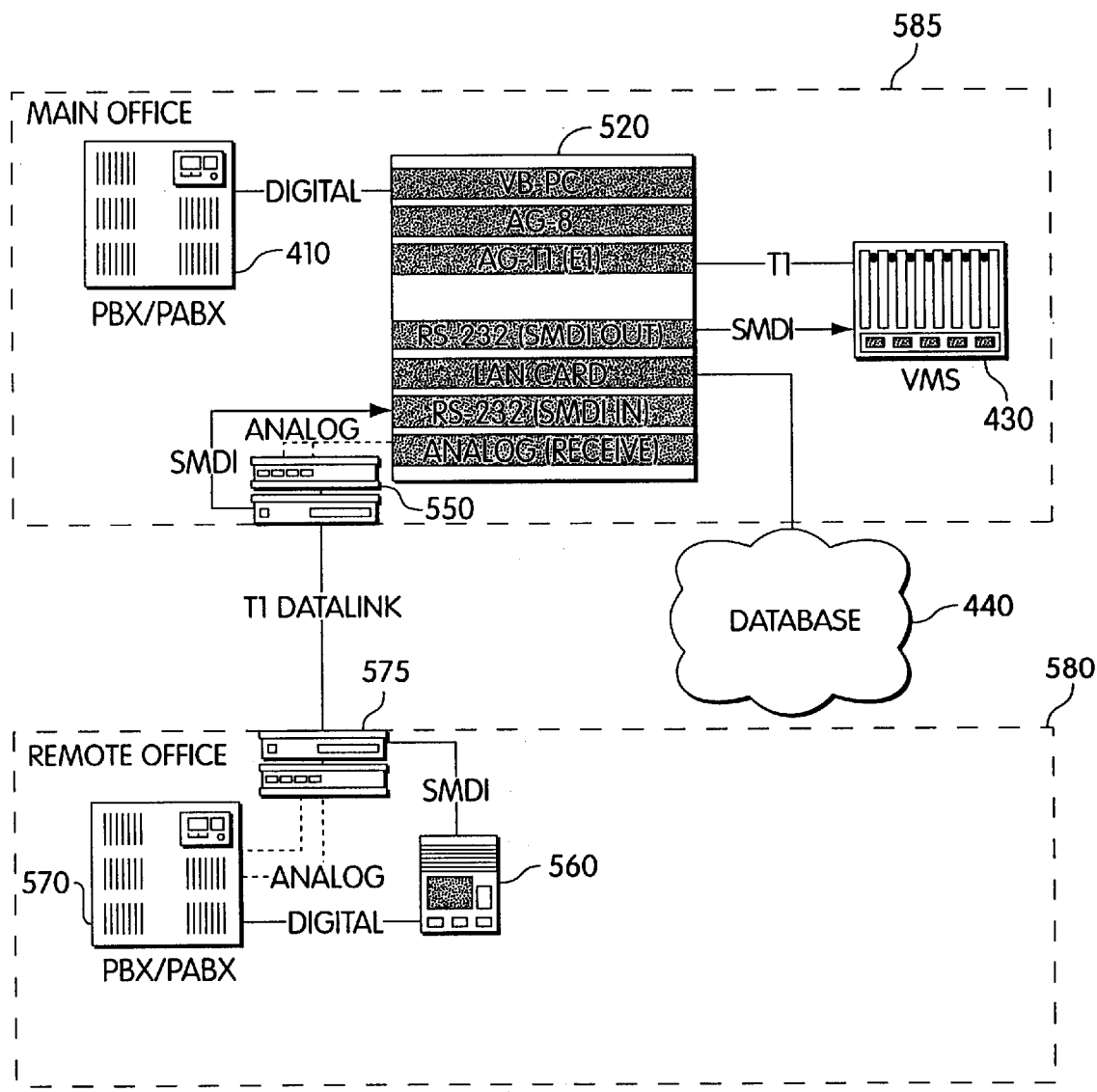
FIG. 5 is a block diagram of a call handling reply system connected to a remote office that does not have a VMS.

In another embodiment of a voice messaging system shown in FIG. 5, a call handling reply system 520 is connected to a voice directory database 440 and a remote office 580 having a PBX 570, but the remote office 580 is not connected to its own VMS. In this embodiment, the remote office 580 shares a VMS 430 located at a main office 585 and receives all the benefits of the system, including a call handling reply capability to external and internal calls. Busy/no answer calls from remote PBX 570 are channeled through a T1 datalink 578 or may be sent directly to main office 585 using PSTN lines (not shown).

A stand-alone hardware unit 560 may be used to interact with PBX 570 and VMS 430. One example hardware unit is Voice Bridge II by Voice Technologies Group. This hardware unit may be used to retrieve caller identification information through a digital phone line if the caller is a member of local PBX 570. Hardware unit 560 may act as a third party monitor and provide call information through, for example, ANI/CID, dialed number identification service (DNIS) or direct inward dial (DID), to the call handling reply system 520 at main office 585. The hardware unit 560 captures caller information which would not otherwise be transferrable by analog phone lines out of PBX 570 in order to limit the number of entries which are searched in database 440.

In this embodiment, additional software in the call handling reply system 520 is used to process incoming SMDI data from the remote office 580, as well as to receive calls from another source in addition to the hardware unit 560. Call handling reply system 520 resolves any overlapping dialing plans between its local PBX 410 and any remote offices to which it may be connected. In this embodiment, the finction of datalink 578 is to channel analog phone lines from the remote office 580 to main office 585. Channel banks 550, 575 may be used to convert analog lines to digital lines or digital lines to analog lines. Therefore, the connection may include analog lines instead of the T1 lines. If analog lines are used, the digital circuit to send SMDI data from remote office 580 may be replaced using a single connected analog line with two modems (not shown).

Figure 6:
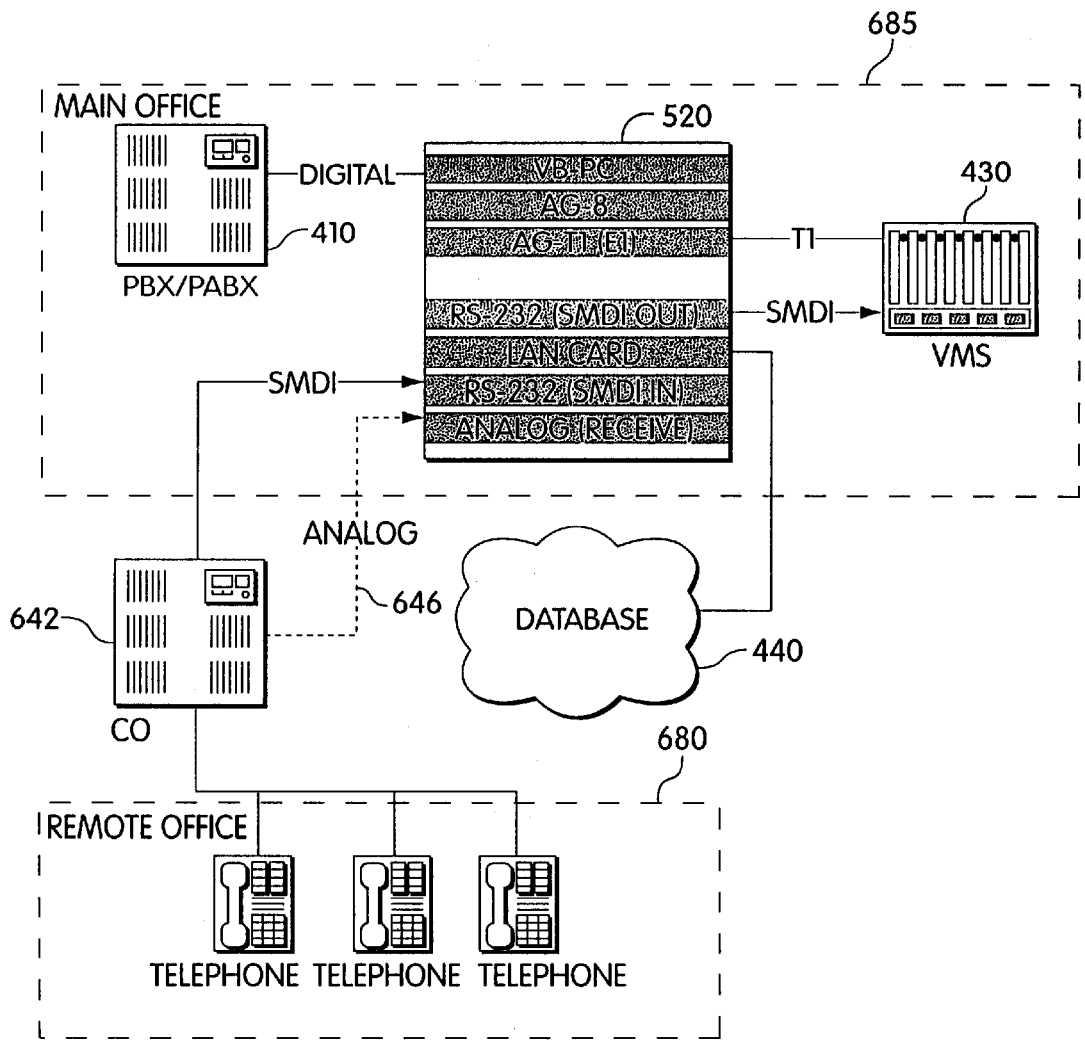
FIG. 6 is a block diagram of a call handling reply system connected to a remote office through a central office.

In another alternative embodiment shown in FIG. 6, a call handling reply system 520 in main office 685 is connected to remote office 680 through a central office (CO) 642. Main office 685 is configured as discussed above in connection with FIG. 5. Remote office 680 shares VMS 430 in the main office 685 and has access to the call handling reply feature through call handling reply system 520. Busy/no answer calls to main office 685 may be received by CO 642 over dedicated modem or data connections. CO 642 sends busy/no answer calls to main office 685 via analog lines 646 or in the alternative, T1 lines. Call handling reply system 520 receives SMDI data from CO 642 over SMDI lines 646, performs a directory lookup in voice directory database 440, creates an SMDI packet and sends the packet to VMS 430. The live call is then passed to VMS 430 and appears to VMS 430 as if it came directly from a PBX. Analog resources on call handling reply system 520 remain in use during the entire time the caller is creating the voice message.

Figure 7:
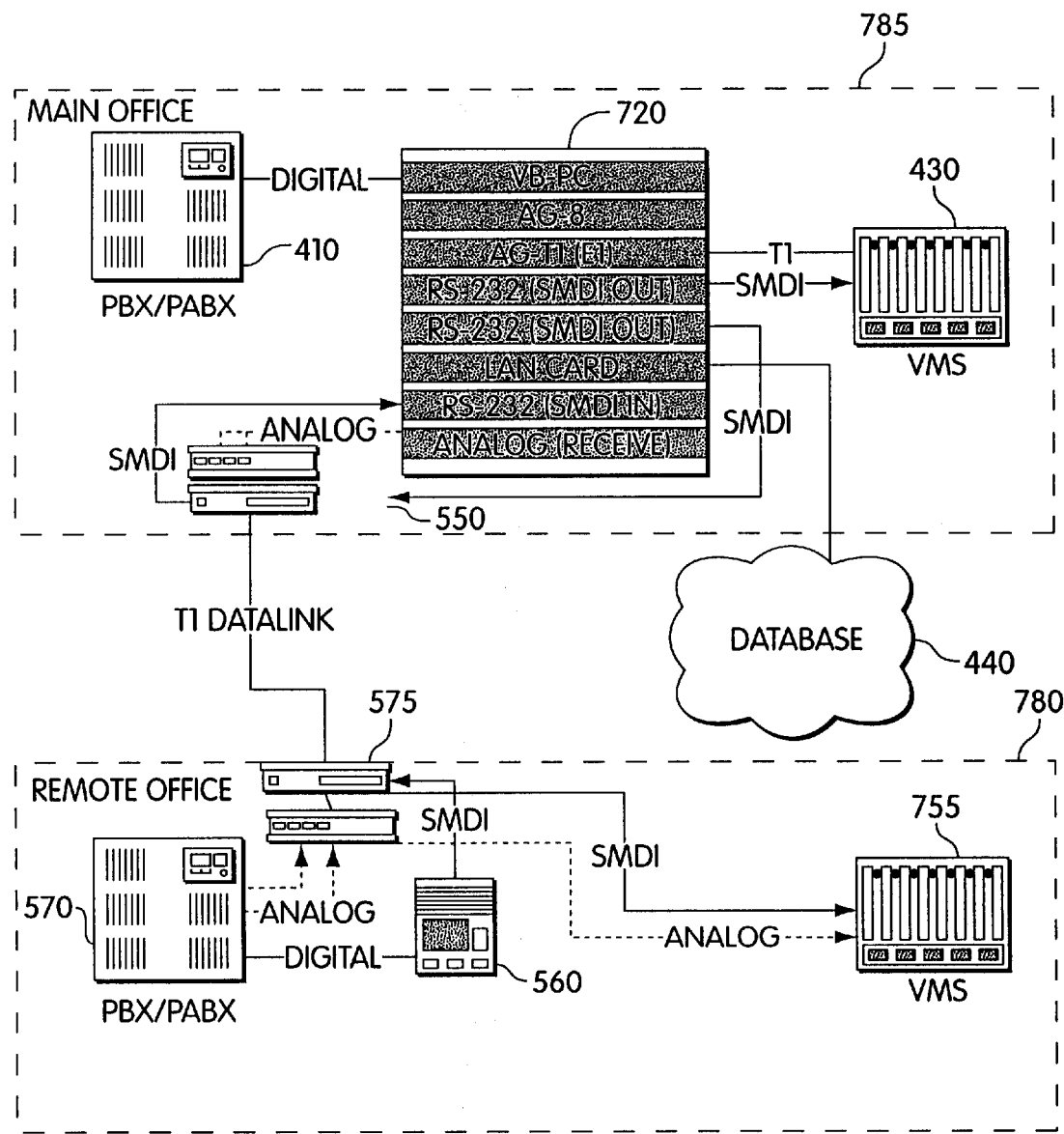
FIG. 7 is a block diagram of a call handling reply system connected to a remote office having a VMS.

FIG. 7 shows another embodiment in which the main office 785 is connected to remote office 780 in a manner similar to the connections shown in FIG. 5, with the addition of a VMS 755 in remote office 780. In this embodiment, T1 datalink 778 includes two live voice channels per external busy/no answer call. One channel is used to provide call handling reply system 720 with a live caller from remote office 780. The second channel is used to feed remote VMS 755 when it records a message from a caller. Both channels are used while the caller leaves the message. Calls made to retrieve messages may be local calls in this embodiment.

Figure 8:
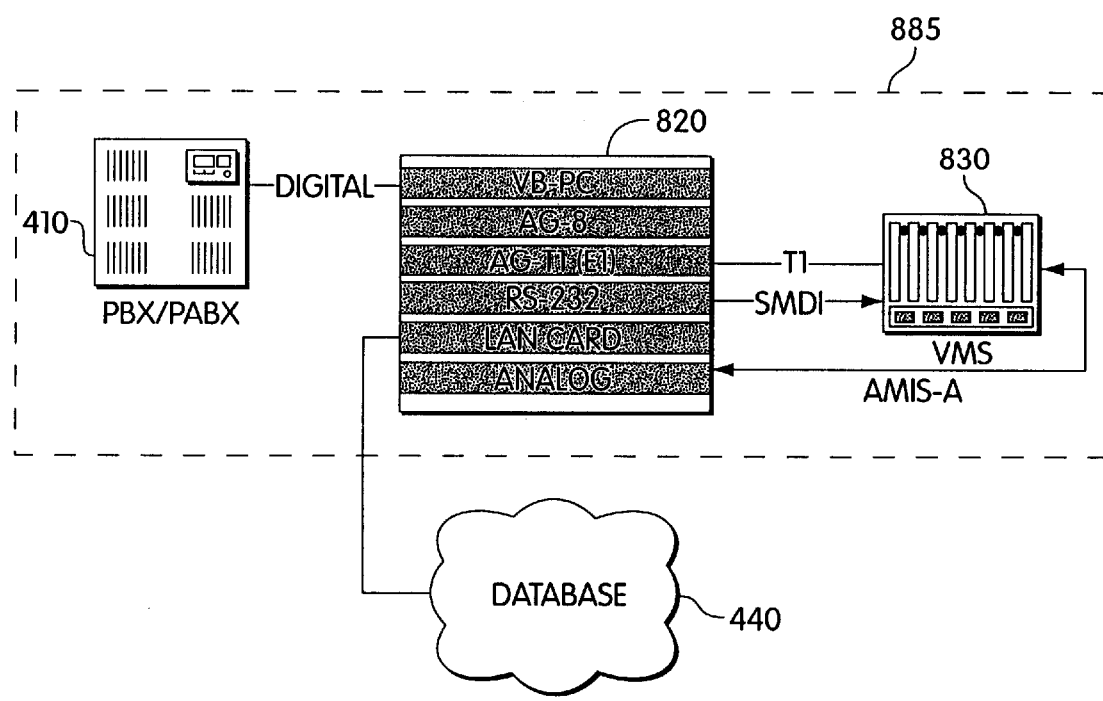
FIG. 8 is a block diagram of a call handling reply system connected to an AMIS-A compliant VMS.

Another embodiment is shown in FIG. 8 in which call handling reply system 820 is connected to an AMIS-A compliant VMS 830. In the previously discussed embodiments, VPIM or other voice message networking may be used. However, in this embodiment shown in FIG. 8, those users without a VPIM interface may also use call handling reply system 820. Call handling reply system 820 includes an analog telephony card to receive outbound network messages sent from a VMS using AMIS-A. The messages received by call handling reply system 820 are converted to a format, such as a proprietary digital format or a VPIM format, to allow the messages to be delivered to another destination. An AMIS voice mail system may be registered with voice directory database 440 to receive inbound messages from a service provider. Inbound messages may be delivered digitally to call handling reply system 820 where they will be converted to AMIS-A messages and delivered to a local VMS.

Figure 9:
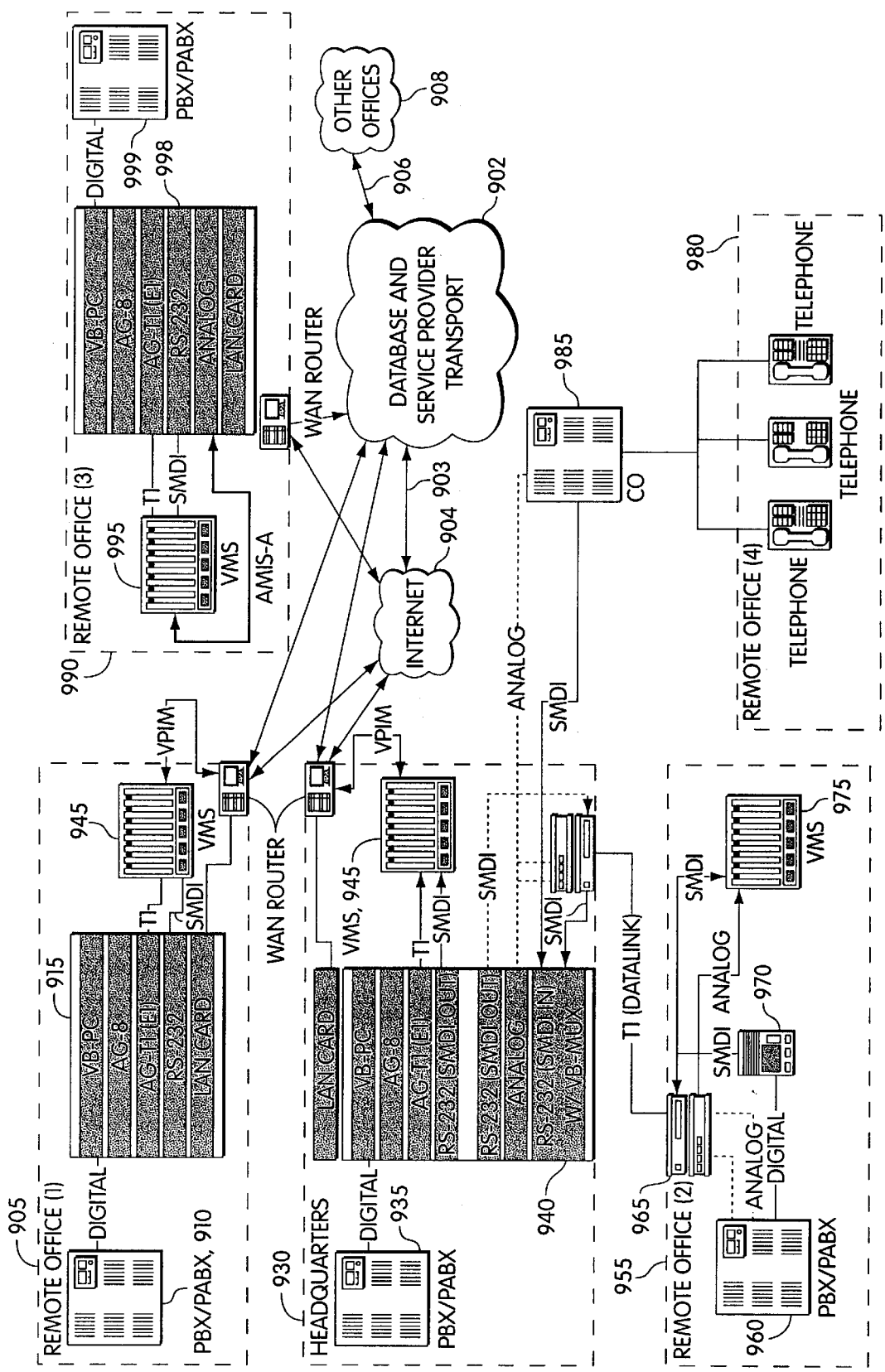
FIG. 9 is a block diagram of multiple call handling reply systems configured between a headquarters office and multiple remote offices.

FIG. 9 is a block diagram of multiple call handling reply systems configured between a headquarters office and multiple remote offices. In the embodiment shown in FIG. 9, a headquarters office 930 connects a call handling reply system 940 between PBX 935 and VMS 945 through a T1 connection (e.g., AG-T1) or analog line (not shown). PBX 935 is reconfigured to map calls normally received over the previously connected T1 or analog lines to a digital phone extension. Call handling reply system 940 is connected to the digital phone extension via a VB-PC board and is connected through a LAN card to Wide Area Network (WAN) router 947. Call handling reply system 940 includes information for local members using call handling reply system 940 and information about external members with whom individuals at headquarters office 930 are doing business.

The handling of a call received by the headquarters office 930 of FIG. 9 will now be described. A call received by PBX 935 at headquarters office 930 is forwarded to a general digital extension. As previously described, call handling reply system 940 receives this call and identifies the caller and the reason the call arrived (e.g., busy, no answer, forwarded, etc.). Caller information, including a reply address, is retrieved from a query to voice directory database 902. Voice directory database 902 may be included in a service provider transport system that transfers voice messages and can identify differences in VMS standards.

A T1 channel in headquarters office 930 or an optional analog line (not shown) is captured to connect call handling reply system 940 to VMS 945. An SMDI data packet is created and includes a reply address for the caller that was retrieved from voice directory database 902 and an identifier for the channel that was captured for use. The SMDI data packet includes the information to allow a reply to the caller. The SMDI packet is sent to VMS 945 prior to call handling reply system 940 initiating a ring on a T1 or analog line to VMS 945. VMS 945 answers the line and retrieves information about the call from the SMDI packet. Call handling reply system 940 attaches the digital extension of the caller to the T1 channel connected to VMS 945. Call handling reply system 940 passes voice data between PBX 935 and VMS 945.

Busy/no answering call handling for the other remote offices in FIG. 9 are similar to the call handling described above in connection with FIGS. 4–8.

The process of enabling a call handling reply as discussed in the embodiments above may be included in current telephony environments and may also be included in new PBX and/or VMS platforms.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method to automatically address a reply to a voice mail message from a caller on a first voice mail system comprising the steps of:
    recording a vocal utterance made by the caller;
    accessing a database to retrieve reply address information about the caller as a function of the recorded vocal utterance; and
    provide the retrieve caller reply address information to a second voice mail system of a recipient to enable to automatic reply.

2. The method of claim 1, comprising:
    identifying a calling location of the caller; and
    accessing the database as a function of the identified calling location and the recorded vocal utterance.

3. A method to automatically address a reply to a voice mail message from a caller on a first voice mail system comprising the steps of:
    indentifying a calling location of the caller;
    accessing a database as function of the indentified calling location to retrieve caller reply information, wherein the caller reply information includes a caller reply address;
    providing the retrieved caller reply address information to a second voice mail system of a recipient to enable the automatic reply; and
    sending the automatic reply to the caller reply address.

4. The method of claim 3, wherein the calling location is different from the caller reply address.

5. The method of claim 3, wherein the reply is transmitted over a data network.

6. The method of claim 3, wherein the reply is a recorded voice message.

7. The method of claim 3, wherein the caller reply address is a voice mailbox.

8. The method of claim 3, wherein the identifying a calling location step comprises automatic number identification.

9. A method of storing a voice mail message from a caller on a first mail system to a recipient on a second voice mail system, comprising the steps of:
    obtaining an identifier for the caller;
    accessing a database as a function of the identifier to retrieve a caller reply address to enable an automatic reply; and
    recording a voice mail message uttered by the caller and storing the caller reply address and the recorded voice mail message for the recipient to access via the second voice mail system.

10. A system to automatically address a reply to a voice mail message on a second voice mail system, from a caller on a first voice mail system, the system comprising:
    means for identifying a calling location of the caller;
    means for recording a vocal utterance made by the caller;
    means for accessing a database of caller information as a function of at least one of the identified calling location and the recorded vocal utterance to determine a reply address of the caller; and
    means for automatically sending a reply to the caller reply address.

11. The system of claim 10, wherein the reply is a voice mail message.

12. A method to automatically address a reply to a voice mail message on a second voice mail system, from a caller on a first voice mail system, comprising the steps of:

identifying a caller by providing a caller generated identifier;

retrieving from a database, based on the caller generated identifier, a reply address for the identified caller;

providing the reply address to the second voice mail system to enable an automatic reply by a recipient; and the caller leaving a voice mail message on the second voice mail system.

13. The method of claim 12, wherein the caller generated identifier includes the spoken name of the caller.

14. The method of claim 12, wherein the caller generated identifier is converted to an analog or digital signal using voice recognition.

15. The method of claim 12, wherein the caller generated identifier is a series of DTMF tones entered by the caller.

16. The method of claim 12, wherein the caller generated identifier comprises automatic number identification.

17. The method of claim 12, wherein the identifying a caller step includes processing the caller generated identifier using speaker verification.

18. The method of claim 12, wherein the second voice mail system provides a recording of the voice message to the recipient.

19. The method of claim 13, wherein the second voice mail system provides a recording of the caller's spoken name.

20. The method of claim 12, wherein the reply address is sent to the second voice mail system over a data network.

21. The method of claim 20, wherein the reply address is sent over the data network as an SMDI data packet.

22. The method of claim 20, wherein the reply address is a Voice Profile for Internet Messaging (VPIM) address.

23. The method of claim 12, wherein the recipient verifies the identity of the caller.

24. The method of claim 23, wherein the recipient verifies the identity of the caller by use of a voice signature.

25. The method of claim 12, wherein the caller is prompted to provide the caller generated identifier.

26. The method of claim 12, wherein the retrieving step includes accessing the database over a data network.

27. The method of claim 12, wherein the recipient accesses the second voice mail system and sends a reply to the reply address.

28. The method of claim 27, wherein the reply is sent over a data network.

29. The method of claim 12, wherein the caller generated identifier includes a calling location of the caller and a recorded vocal utterance.

30. A system for storing a voice mail message from a caller on a first voice mail system to a recipient on a second voice mail system comprising:

means for obtaining an identifier for the caller;

means for accessing a database as a function of the identifier to retrieve a caller reply address to enable an automatic reply; and means for recording a voice mail message uttered by the caller and storing the caller reply address and the recorded voice mail message for the recipient to access via the second voice mail system.

31. The system of claim 30, wherein the identifier is a calling location which is identified by receiving ANI information of caller-ID information from a PSTN.

32. The system of claim 30, wherein the retrieved reply address is a Voice Profile for Internet Messaging (VPIM) address.

33. The system of claim 30, wherein the reply is sent via a data network.

* * * * *

UNITED STATES PATENT AND TRADEMARK OFFICE
CERTIFICATE OF CORRECTION

PATENT NO.    : 6,292,799 B1
DATED         : September 18, 2001
INVENTOR(S)   : David Peek, Paul F. Finnigan, Rosanna Garcia It is certified that error appears in the above-identified patent and that said Letters Patent is hereby corrected as shown below:

<u>Column 12, claim 1,</u>
Line 14, "provide" should read -- providing --
Line 14, "retrieve" should read -- retrieved --
Line 15, "enable" should read -- enable the --

Signed and Sealed this

Twenty-sixth Day of February, 2002

Attest:

JAMES E. ROGAN
Attesting Officer    Director of the United States Patent and Trademark Office